(12) United States Patent
Chae et al.

(10) Patent No.: US 11,191,621 B2
(45) Date of Patent: Dec. 7, 2021

(54) DENTAL IMPLANT STRUCTURE

(71) Applicants: Heejin Chae, Busan (KR); Yunja Kim, Busan (KR)

(72) Inventors: Heejin Chae, Busan (KR); Yunja Kim, Busan (KR); Gochun Park, Busan (KR); Jongung Kwon, Busan (KR)

(73) Assignees: Heejin Chae, Busan (KR); Yunja Kim, Busan (KR)

( * ) Notice: Subject to any disclaimer, the term of this patent is extended or adjusted under 35 U.S.C. 154(b) by 972 days.

(21) Appl. No.: 15/038,459

(22) PCT Filed: Nov. 14, 2014

(86) PCT No.: PCT/KR2014/010937
§ 371 (c)(1),
(2) Date: May 21, 2016

(87) PCT Pub. No.: WO2015/076530
PCT Pub. Date: May 28, 2015

(65) Prior Publication Data
US 2016/0287357 A1      Oct. 6, 2016

(30) Foreign Application Priority Data
Nov. 21, 2013 (KR) .................. 10-2013-0142146

(51) Int. Cl.
*A61C 8/00* (2006.01)
(52) U.S. Cl.
CPC .......... *A61C 8/0053* (2013.01); *A61C 8/0048* (2013.01); *A61C 8/0066* (2013.01); *A61C 8/0069* (2013.01); *A61C 8/0074* (2013.01)

(58) Field of Classification Search
CPC ...... A61C 8/0048–0075; A61C 13/265; A61C 13/2653; A61C 13/2656
See application file for complete search history.

(56) References Cited

U.S. PATENT DOCUMENTS

| | | | | |
|---|---|---|---|---|
| 3,514,858 A | * | 6/1970 | Silverman ............ | A61C 8/0075 433/174 |
| 5,997,300 A | * | 12/1999 | Tseng ................. | A61C 13/2656 433/177 |
| 9,517,114 B2 | * | 12/2016 | Mullaly ............. | A61C 13/2656 |
| 10,617,493 B2 | * | 4/2020 | Chae ................... | A61C 8/0066 |

(Continued)

FOREIGN PATENT DOCUMENTS

| EP | 0891750 A1 | 1/1999 | |
|---|---|---|---|
| EP | 2647347 A1 | 10/2013 | |
| JP | 5514972 B2 * | 6/2014 | ............... A61F 2/36 |

(Continued)

OTHER PUBLICATIONS

English translation of 10-2008-0104624.
(Continued)

*Primary Examiner* — Edward Moran
(74) *Attorney, Agent, or Firm* — The PL Law Group, PLLC

(57) ABSTRACT

The present invention relates to an implant and, more specifically, has a fixture having a circular ball shape and a socket structure of an abutment body coupled to the fixture, and thus enables improvement of the matching between the fixture and an abutment which are an implant structure during an implant procedure.

3 Claims, 4 Drawing Sheets

(56) References Cited

U.S. PATENT DOCUMENTS

2004/0101806 A1* 5/2004 Kumar ................ A61C 8/0001
433/173
2008/0153063 A1* 6/2008 Mullaly ............... A61C 8/0087
433/174

FOREIGN PATENT DOCUMENTS

| KR | 10-2008-0104624 | 12/2008 |
| KR | 10-2009-0080572 | 7/2009 |
| KR | 10-2010-0051972 | 5/2010 |
| KR | 10-2011-0019708 | 2/2011 |

OTHER PUBLICATIONS

English translation of 10-2009-0080572.
English translation of 10-2011-0019708.
English translation of 10-2010-0051972.

* cited by examiner

[Fig. 1]
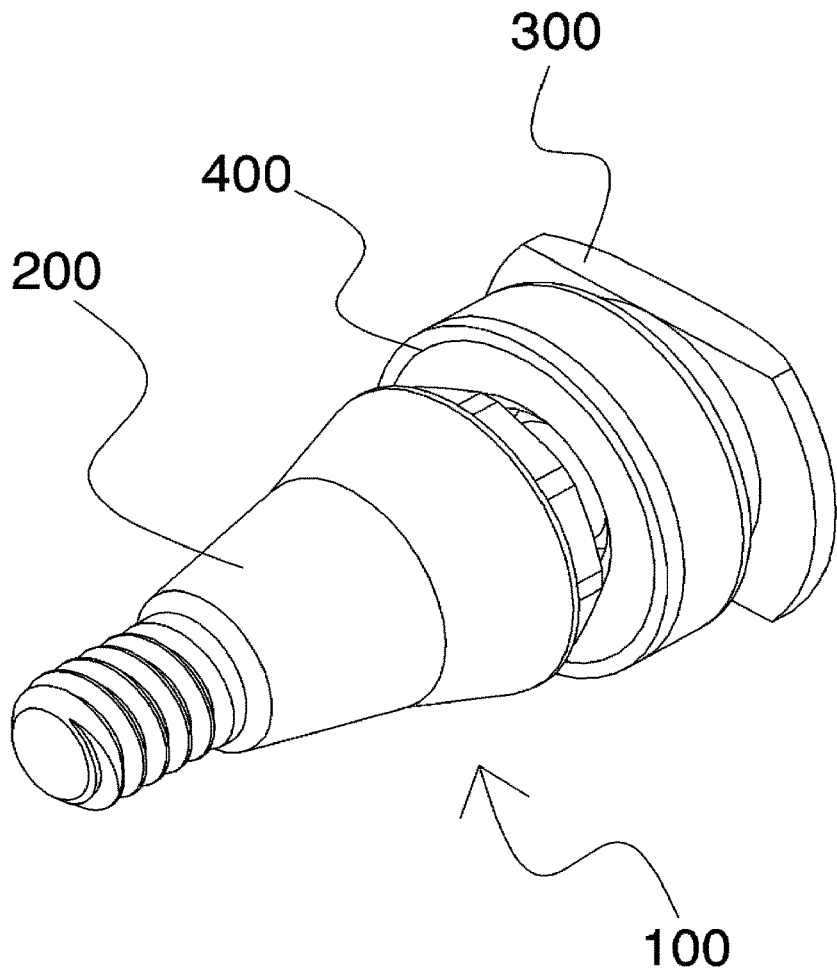
[Fig. 2]
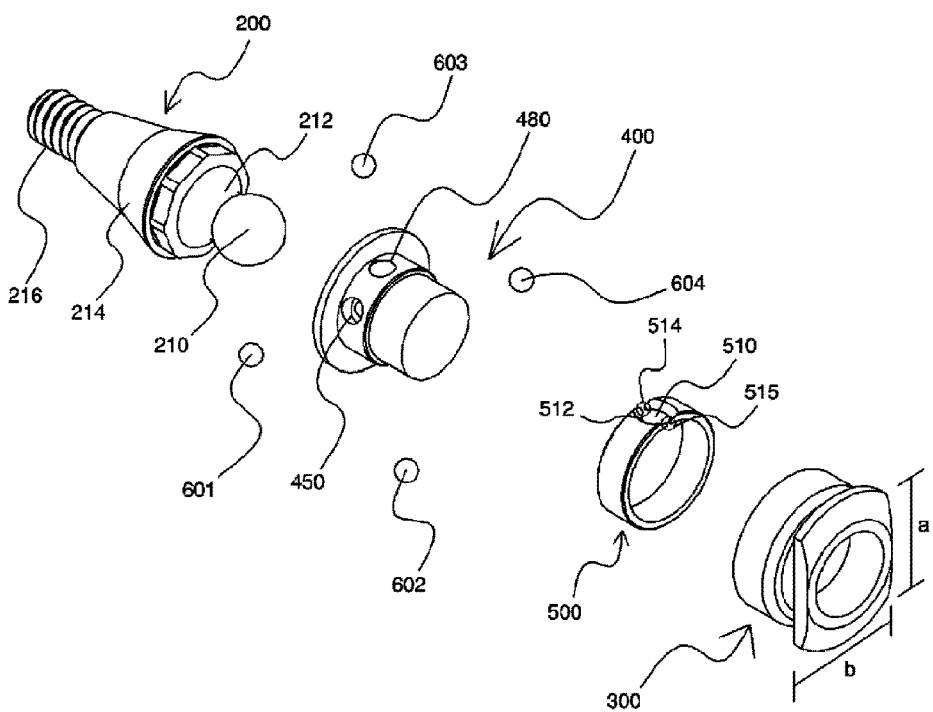

[Fig. 3]
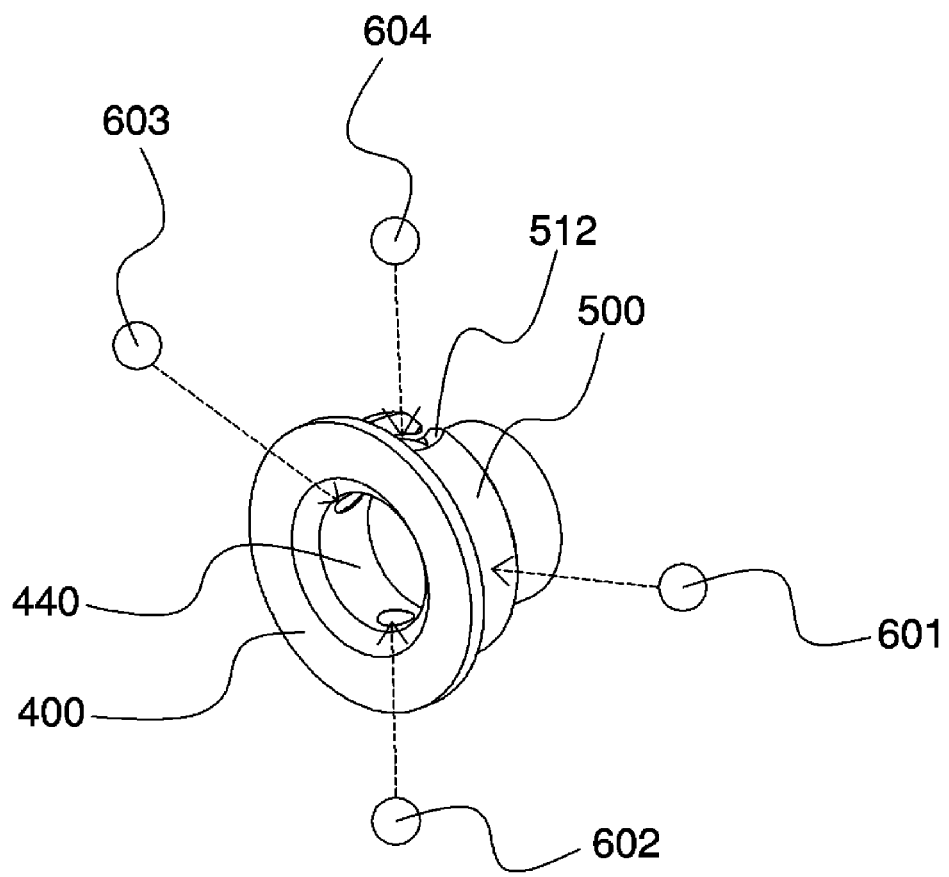
[Fig. 4]
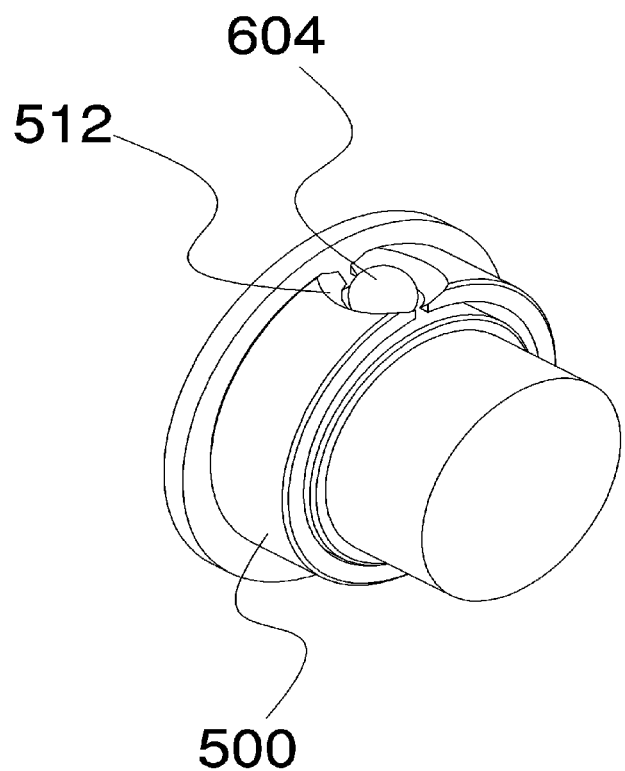

[Fig. 5]
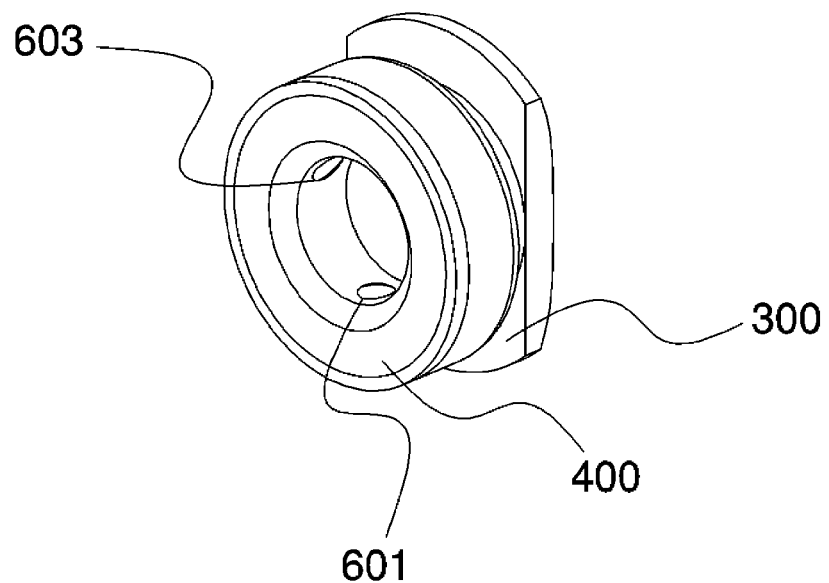
[Fig. 6]
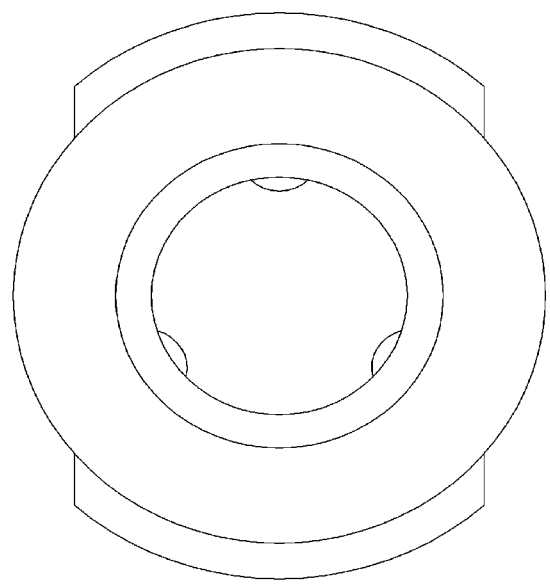

[Fig. 7]
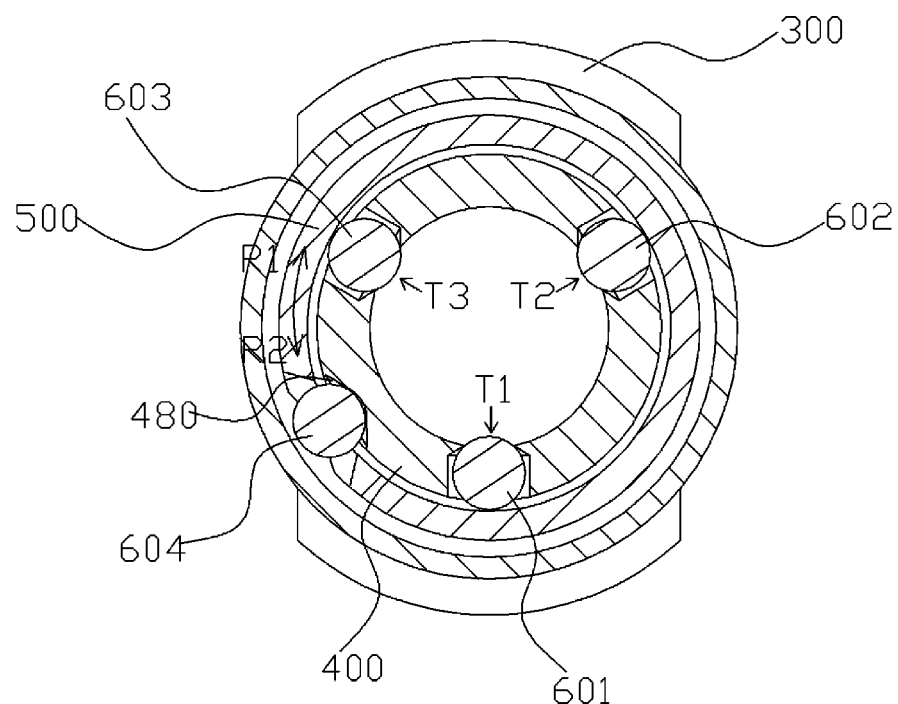
[Fig. 8]
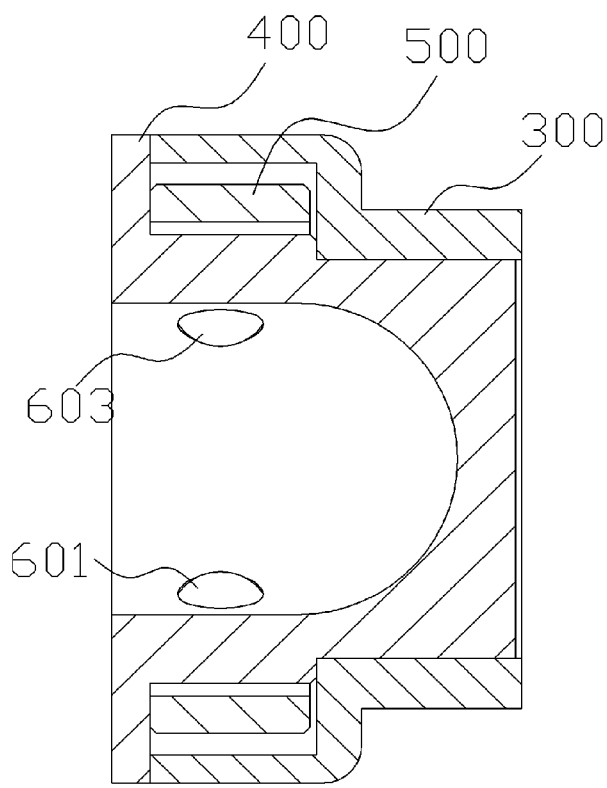

DENTAL IMPLANT STRUCTURE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/010937, filed Nov. 14, 2014, which claims priority to the benefit of Korean Patent Application No. 10-2013-0142146 filed in the Korean Intellectual Property Office on Nov. 21, 2013, the entire contents of which are incorporated herein by reference.

BACKGROUND

(a) Technical Field

The present invention belongs to a technical field relating to a structure for improving the matching of the implant by using the ball and socket structure in the dental implant.

(b) Background Art

An implant means a substitute which restores the human body tissue when it is damaged, and for the dentistry means the transplanting of the artificially made teeth. That is, it is a means for burying the teeth in the human body jaw-bone semi-permanently.

In case of the general prosthesis or denture, the peripheral teeth and the bone are damaged upon elapse of time, however, the implant has an advantage that the peripheral teeth tissue is not damaged and the function and the shape of the implant is identical to the natural teeth and the decayed teeth do not occur so that the implant can be used semi-permanently.

In the meantime, there are problems that it often occurs that the fixture to be buried in the mandible is not buried correctly vertically during an implant procedure, and the fixture which has been buried inclined degrades the matching with the member buried in the maxilla so as to impair the rigidity of the entire implant structure and cause the pain to the patient so that the patient should visit the dentistry every three to six months and change the pmel so that there is annoyance and the cost for medical treatment is increased, and also the case of additional surgery occurs.

In consideration of these problems, the present invention suggests the implant structure which has no wear of pmel so as to be able to be used for the very long time by suggesting an abutment structure in which the upper part of the abutment 200 is formed in the ball shape and which has a socket structure in the form corresponding to the ball.

SUMMARY

The object of the present invention is to provide an implant structure which has advantages in that it can improve the structural matching of the entire implant by forming the combination of an upper part of an abutment and a housing which accommodates the abutment by using the ball and socket structure and it can cope with a case where the fixture is not vertically buried at the mandible.

A dental implant structure to accomplish the object described above comprises:

an abutment 200 formed with a screw 216 at its end;

a head 210 formed in ball shape at the upper end of the abutment;

a housing 400 which accommodates the head, is combined to the abutment, is formed at its side with at least three ball accommodation holes 450 to accommodate head fixing balls 601, 602, 603, and at the same time is formed with a ball accommodating recess 480 at which a rotation prevention ball 604 can be seated;

a ring spring 500 which covers the ball accommodation holes 450, is mounted at the peripheral surface of the housing, and is formed with separation sections 514, 515 which are partially cut, wherein a ring spring space section 510 is formed in a form of a circle between the separation sections 514, 515 so that the rotation prevention ball 604 is seated; and a cap 300 combined to the housing 400 while covering the ring spring, wherein the abutment 200 is formed in a circular column shape having the width which is gradually increased going from the screw position of the abutment to the other side, and wherein a concave 212 of a curved surface having the with narrower than the diameter of the head 210 is formed at the portion adjoining the head 210 formed in ball shape at the distal end of the abutment so that after the head 210 is inserted in the housing 400, the concave and the head fixing balls 601, 602, 603 contact each other, wherein at the side of the housing 400 are formed at least three ball accommodation holes 450, wherein the three holes are formed spaced at angle of 120 degree along the side of the housing 400, wherein each ball 601, 602, 603 corresponding to each of the ball accommodation holes 450 is positioned at the ball accommodation holes, wherein the diameter of the ball is formed to be larger than the ball accommodation holes 450, and wherein the balls are displaced when the head 210 is drawn into the head accommodation section 440, wherein the ring spring 500 is inserted at a portion of the housing 400 where the ball accommodation holes 450 is formed, so as to block the ball accommodation holes 450, and wherein the ring spring 500 is formed in a ring shape, and wherein at the periphery of the ring spring space section 510, a ball contact surface 512 of curved surface where the rotation prevention ball 604 can be seated is formed.

In the present invention, since the combination of the upper part of the abutment and the housing which accommodates the abutment and combines with it is carried out by the ball and socket structure, there are advantages in that even at the case where the fixture is not vertically buried at the mandible, the combination can be carried out freely regardless thereof, so that the operation mistake occurring during an operation procedure can be covered.

In particular, the ball mounted at one side of the ring spring performs the function of preventing the rotation of the ring spring so that the implant structure can be stably fixed.

BRIEF DESCRIPTION OF THE DRAWINGS

FIG. 1 is a combinational perspective view of an implant structure according to a preferred embodiment of the present invention;

FIG. 2 is an exploded perspective view of the implant structure of FIG. 1;

FIG. 3 is a drawing for illustrating a combinational structure of a housing 400, a ring spring 500 and a number of balls;

FIG. 4 is a state drawing in which a rotation prevention ball 604 is seated on a ball contact surface 512 of the ring spring;

FIG. 5 is a state drawing in which a cap 300 and the housing 400 are combined;

FIG. 6 is a front view viewed from the front of FIG. 5;

FIG. 7 is a sectional view for illustrating the structure and the function of the number of balls in the state of FIG. 5; and FIG. 8 is a side elevation view of FIG. 5.

DETAILED DESCRIPTION

The best form for embodying the present invention is as follows:

That is, a dental implant structure comprises:

an abutment 200 formed with a screw 216 at its end;

a bead 210 formed in ball shape at the upper end of the abutment;

a housing 400 which accommodates the head, is combined to the abutment, is formed at its side with at least three ball accommodation holes 450 to accommodate head fixing balls 601, 602, 603, and at the same time is formed with a ball accommodating recess 480 at which a rotation prevention ball 604 can be seated;

a ring spring 500 which covers the ball accommodation holes 450, is mounted at the peripheral surface of the housing, and is formed with separation sections 514, 515 which are partially cut, wherein a ring spring space section 510 is formed in a form of a circle between the separation sections 514, 515 so that the rotation prevention ball 604 is seated; and a cap 300 combined to the housing 400 while covering the ring spring.

Hereinafter, the implant structure according to a preferred embodiment of the present invention will be described.

However, it should be appreciated that the scope of the right of the present invention is not limited to the embodiments described below but should be comprehended within a scope equivalent to the claims.

FIG. 1 is a combinational perspective view of an implant structure according to a preferred embodiment of the present invention; FIG. 2 is an exploded perspective view of the implant structure of FIG. 1; FIG. 3 is a drawing for illustrating a combinational structure of a housing 400, a ring spring 500 and a number of balls; FIG. 4 is a state drawing in which a rotation prevention ball 604 is seated on a ball contact surface 512 of the ring spring; FIG. 5 is a state drawing in which a cap 300 and the housing 400 are combined; FIG. 6 is a front view viewed from the front of FIG. 5; FIG. 7 is a sectional view for illustrating the structure and the function of the number of balls in the state of FIG. 5; and FIG. 8 is a side elevation view of FIG. 5.

In FIGS. 1 and 2, since a fixture which is a support which is buried in the mandible corresponding to a lower jaw of a patient in the present invention is a publicly known technology, it is not shown.

It is a common sense in this technical field that a screw 216 portion of an abutment 200 of FIG. 2 can be combined to a female screw portion of the fixture not shown or that the screw portion itself can replace the role of the fixture by forming the screw 216 portion to be long.

Therefore, in the drawings of the present invention, the structure and the function of the abutment combined to the upper part of the normal fixture and the members combined to the abutment will be described.

The present invention largely comprises an abutment 200, a housing 400 combined to an upper head 210 of the abutment, a ring spring 500 mounted at the peripheral surface of the housing, and a cap 300 combined to one side of the housing 400 while covering the ring spring.

The abutment 200 is formed with an abutment body 214 which is formed with a screw 216 at its lower part and is formed in a circular column shape having the width which is gradually increased going from the screw position to the other side, and a head 210 formed in ball shape at the distal end of the abutment.

The portion just below the head 210 is formed with a concave 212 of a curved surface having the width narrower than the head 210.

The head 210 is accommodated in the housing 400. In the housing 400 is formed a head accommodation section 440 (FIG. 3) which is a space acting a role of a socket for accommodating the head 210 of the ball shape.

At the side of the housing 400 are formed at least three ball accommodation holes 450 which are formed to communicate with the outside.

In FIG. 2, although only one ball accommodation hole 450 is seen, three holes are formed along the side of the housing 400 at angle of 120 degree respectively.

Each head fixing ball 601, 602, 603 corresponding to each of the ball accommodation holes 450 is positioned at the ball accommodation holes, and the diameter of the ball is formed to be larger than the ball accommodation holes 450, and at the ball accommodation hole 450 position is possible a partial displacement of the halls moving into and out of the head accommodation section 440. It is preferable that the number of the head fixing balls 601, 602, 603 is three or more.

These head fixing balls 601, 602, 603 are pushed by the head 210 so as to be displaced when the head 210 is drawn into the bead accommodation section 440 (FIG. 3).

Referring to FIG. 7, T1, T2, T3 represent directions in which the head 210 contacts the head fixing balls 601, 602, 603 and pushes the three balls. In FIG. 7, the head 210 is not shown for conveniences.

A ring spring 500 is inserted at a portion of the housing 400 where the ball accommodation holes 450 are formed, so as to block the ball accommodation holes 450.

FIG. 3 shows a state of combination the housing 400 and the ring spring 500.

The ring spring 500 is formed in a ring shape, however, a part thereof is cut out.

The ring spring is cut in a form of a circle at the inner side of separation section 514, 515 where one side of the ring spring is cut, and at the middle thereof is formed a void space referred to as a ring spring space section 510.

And, at the periphery of the ring spring space section 510, a ball contact surface 512 of curved surface where the rotation prevention ball 604 can be seated is formed.

Referring to FIG. 3, it can be seen that the housing 400 and the ring spring are combined so that a ball accommodating recess 480 formed at a side of the housing 400 and the ball contact surface 512 of the ring spring correspond to each other.

FIG. 4 shows a state of the combination of FIG. 3 viewed at another angle.

In the meantime, the cap 300 covers the ring spring 500 in the state of FIG. 3 and is a portion acting a role of a lid finally combined to the housing 400.

In FIG. 2, the longitudinal size and the transverse size of one distal end of the cap are respectively represented as a, b, and the b portion is formed to be small to correspond to the narrow teethridge width of the patient by making the b portion smaller than the a portion.

Referring to the combinational section drawing of FIG. 8, the housing 400 and the cap 300 are combined to be in a position to act a role of an outer housing, and the ring spring 500 is inserted in them.

Referring to FIGS. 5 to 7, the roles of the four balls described above will be described as follows:

FIG. 5 is a state drawing in which a cap 300 and the housing 400 are combined, FIG. 6 is a front view viewed from the front of FIG. 5, and FIG. 7 is a sectional view for illustrating the structure and the function of the number of balls in the state of FIG. 5.

If the head 210 is accommodated in the head accommodation section 440, then the head fixing balls 601, 602, 603 are displaced in the direction of T1, T2, T3, and at this time, the ring spring receives the force from the three balls 601, 602, 603 so that the separation sections 514, 515 which are the cut portions of the ring spring are wide opened.

At the same time, the head 210 is pushed into the housing 400 so as to be combined, the wide opened ring spring is again restored, the three balls 601, 602, 603 are again restored to their original positions in the direction opposite to the T1, T2, T3, and the concave section 212 (FIG. 2) which is a portion proximate to the head and the three head fixing balls 601, 602, 603 mutually contact.

In the meantime, the rotation prevention ball 004 is seated at the ball contact surface 512 (FIG. 3) of the ring spring 500 and at the same time one side of the rotation prevention ball 604 maintains the state of being inserted in the ball accommodating recess 480 of the housing 400.

This rotation prevention ball 604 plays the role of preventing the ring spring 500 from being rotated while the ring spring 500 is in the state of FIG. 8.

That is, since the ring spring 500 exists in the intermediate space formed by combination of the cap 300 and the housing 400, a device for preventing the ring spring from rotating in the direction of R1 or R2 (FIG. 7) is necessary, however, here the structural instability of the implant structure can be removed by stably fixing the ring spring by the rotation prevention ball 604.

The present invention is characterized in that the ball and socket structure is applied to the combination of the abutment and the housing which accommodates the abutment.

Here, the head accommodation section 440 takes charge of the role of the socket, and the positions of the bead 210 and the ring spring 500 are stably hold by the number of balls 601, 602, 603, 604.

In the conventional implant structure, the upper part of the abutment is not in the form of sphere.

During an implant procedure, in case where a mistake happens that the fixture is inclined and buried in the mandible, it is very dangerous and a large problem has been suggested that the implant eventually cannot perform its function and an operation should be carried out again, however, in the present invention, even in case where the fixture is inclined more or less and buried in the mandible, due to the structural characteristic of the ball and socket, there is an advantage that the implant structure can be installed in a direction which is not a direction parallel to the fixture buried inclined, that is, in a direction parallel to the movement of the jaw through the ball and socket structure of the upper side of the abutment regardless of the inclined fixture, so that the problems of the conventional implant structure as described above can be solved.

It will be appreciated that although the present invent ion has been described by referring only to the embodiments described above, the present invention can be practiced in various ways within the scope not departing from the technical thoughts of the present invention, and their contents belong to the right of the present invention.

The present invention relates to a structure for improving the matching of the implant by using the ball and socket structure and can be used usefully in the dental implant field.

The invention claimed is:

1. A dental implant structure comprising:
an abutment formed with a screw at its end;
a head formed in a ball shape at the upper end of the abutment;
a housing which accommodates the head, wherein the housing is connected to the abutment, comprises at its side at least three ball accommodation holes accommodating head fixing balls, and at the same time comprises a ball accommodating recess at which a rotation prevention ball is seated;
a ring spring which covers the ball accommodation holes and the head fixing balls, wherein the ring spring is mounted at the peripheral surface of the housing, and comprises separation sections which are partially cut, wherein a ring spring space section is formed in a form of a circle between the separation sections, so that the rotation prevention ball is seated therein; and
a cap connected to the housing while covering the ring spring.

2. The dental implant structure of claim 1, wherein the abutment comprises a circular column shape having a width which is gradually increased going from the screw end of the abutment to the upper end, and wherein a concave of a curved surface has a width narrower than the diameter of the head is formed at a portion adjoining the head formed in a ball shape at a distal end of the abutment so that after the head is inserted in the housing, the concave and the head fixing balls contact each other.

3. The dental implant structure of claim 2, wherein the three ball accommodation holes are formed spaced at an angle of 120 degrees along the side of the housing, wherein each ball corresponds to each of the ball accommodation holes and is positioned at the ball accommodation holes, wherein the diameter of the ball is formed to be larger than the ball accommodation holes, wherein the balls are displaced outward when the head is drawn into the head accommodation section, wherein the ring spring is placed around a portion of the housing where the ball accommodation holes are formed, so as to block the ball accommodation holes, wherein the ring spring is formed in a ring shape.

\* \* \* \* \*